United States Patent [19]
Pommer et al.

[11] 3,860,655
[45] Jan. 14, 1975

[54] PRODUCTION OF 6,10-DIMETHYLUNDECATRIEN-(3,5,10)-ONE-(2)

[75] Inventors: Horst Pommer; Werner Reif; Heinrich Pasedach; Werner Hoffmann, all of Ludwigshafen, Germany

[73] Assignee: Badische Anilin- & Soda-Fabrik Aktiengesellschaft, Rheinland-Pfalz, Germany

[22] Filed: Nov. 20, 1970

[21] Appl. No.: 91,571

Related U.S. Application Data

[63] Continuation-in-part of Ser. No. 701,536, Jan. 30, 1968, abandoned.

[52] U.S. Cl. ............................. 260/595, 260/586 C
[51] Int. Cl. ............................................ C07c 45/18
[58] Field of Search ................. 260/587, 595, 593 R

[56] References Cited
FOREIGN PATENTS OR APPLICATIONS
709,747    7/1968    Belgium .............................. 260/587

OTHER PUBLICATIONS

Noller, "Chemistry of Organic Compounds," pp. 101 and 598, (1965).

Primary Examiner—Leon Zitver
Assistant Examiner—Gerald A. Schwartz
Attorney, Agent, or Firm—Johnston, Keil, Thompson & Shurtleff

[57] ABSTRACT

Production of β-ionone by reaction of 3,7-dimethylocten-(7)-yn-(1)-ol-(3) with a lower alkanol ester of acetoacetic acid at a temperature of from 100° to 400°C and treating the reaction mixture with an acid catalyst at a temperature of from 100° to 400°C and cyclizing the 6,10-dimethylundecatrien-(3,5,10)-one-(2) obtained by contacting with concentrated sulfuric acid at temperatures of from −30 to +20°C.

5 Claims, No Drawings

PRODUCTION OF 6,10-DIMETHYLUNDECATRIEN-(3,5,10)-ONE-(2)

This application is a continuation-in-part of U.S. application Ser. No. 701,536, filed Jan. 30, 1968, now abandoned.

The present invention relates to an improved process for the production of β-ionone.

β-ionone is gaining increasing importance as a precursor of vitamin A for which demand is constantly growing. Considerable efforts have been made to develop a process which would provide β-ionone in pure form and good yields.

U.S. Pat. No. 2,661,368 describes a method of producing pseudoionone, a precursor of ionone, by reaction of 1-methyl-1-(4-methyl-3-penten-1-yl)-propargyl alcohol with diketene and thermal decarboxylation of the resultant acetoacetate (I) to form pseudoionone (II):

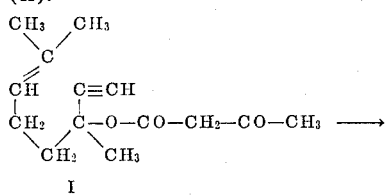

I

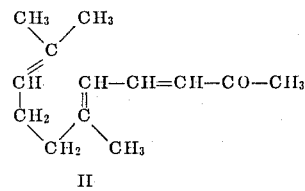

II

The yield of pseudoionone in this process is only 44–55 percent of the theory (cf. German Printed Application 1,021,354).

Thermal decarboxylation of the acetoacetate in the presence of aluminum tri(lower alkoxide) and a lower fatty acid as described in U.S. Pat. No. 2,839,579 does not give any appreciable improvement in the yield.

According to U.S. Pat. No. 3,238,260 the poor yields of pseudoionone II obtained in the thermal decarboxylation of the acetoacetate I are due to the formation of a five-membered cyclic ketone III:

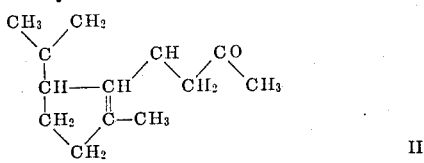

III

To avoid this side reaction it is suggested that ethynyl carbinols of formula IV or V:

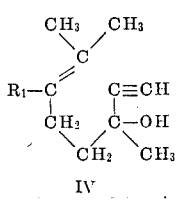

IV

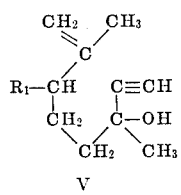

V be reacted with alcohols to form ethers having formula VI:

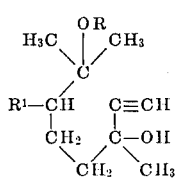

VI prior to the reaction to the corresponding acetoacetates and thermal decarboxylation. However, this process is awkward and expensive.

It is stated in German Patent specification No. 1,000,374 that 6,10-dimethylundecatrien-(3,5,10)-one-(2) can be prepared by reaction of 3,7-dimethylocten (7)-9n-(1)-ol-(3) with esters of acetoacetic acid. If this reaction be carried out under the conventional conditions for the reaction of other acetylene alcohols with esters of acetoacetic acid (cf. German Pat. specification No. 1,026,743), a yield of only 60 to 65 percent of the theory is obtained. Moreover the product is not pure and contains many isomers. This is borne out by the fact that when the product is further processed into ionone a mixture of α- and β-ionone is obtained and that in a yield of only 56 percent of the theory (German Pat. specification No. 1,000,374).

It is the object of this invention to produce β-ionone in a simple manner in higher yields and free of isomeric α-ionone.

We have found that surprisingly β-ionone is obtained in exceptionally good yields and practically free of isomeric α-ionone when a. 3,7-dimethylocten-(7)-yn-(1)ol-3) is reacted with a lower alkanol ester of acetoacetic acid at a temperature of from 100° to 400°C and the reaction mixture is treated with about 0.01 to 10 percent by weight, with reference to the starting material, of an acid catalyst at a temperature of from 100° to 400°C and b. the 6,10-dimethylundecatrien-(3,5,10)-one-(2) obtained is cyclized by contacting with concentrated sulfuric acid at a temperature of from −30° to +20°C.

It is furthermore surprising that the treatment of the reaction mixture of 3,7-dimethylocten-(7)-yn-(1)-ol-(3) and said alkanol ester of acetoacetic acid at a temperature of from 100° to 400°C not only gives better yields of 6,10-dimethylundecatrien-(3,5,10)-one-(2) but also causes isomers which can be cyclized to β-ionone only with difficulty or not at all to be rearranged to isomers (cis-trans and trans-trans) which are easily cyclized to the desired β-ionone.

This is unobvious, particularly in view of the fact that U.K. Pat. No. 803,364 (page 2, column 1, lines 29 to 38) advises against decarboxylation of acetoacetate I in the presence of acids on the grounds that various cyclization products having different characteristics would be formed from the unsaturated ketones formed under acid conditions.

The acetoacetic ester used is in general derived from a lower alcohol, particularly one having one to four carbon atom, such as methanol, ethanol, isobutanol and ter-butanol. The dimethylocteninol and the acetoacetic ester are in general used in a molar ratio of from 1:1 to 1:20, particularly from 1:1 to 1:4.

The reaction of step a) is carried out at a temperature of from 100° to 400°C, preferably from 150° to 250°C, particularly from 150° to 200°C. The progress of the reaction can easily be followed because carbon dioxide and alcohol are eliminated. The optimum reaction period, which in general is from ten to one thousand minutes, may easily be determined by experiment.

It is essential for the acid catalysts to be present during the reaction of the 3,7-dimethylocten- (7)-yn-(1)-ol-(3) and the ester of acetoacetic acid and/or for the product of said reaction to be heated for some time, for example 10 to 1,000 minutes, with the acid catalyst at temperatures of from 100° to 400°C, preferably from 150° to 250°C and particularly from 175° to 195°C.

The point in time at which the reaction product obtained from 3,7-dimethylocten-(7)-yn-(1)-ol-(3) and the said acetoacetic acid ester is treated with the acid catalyst at temperatures of from 100° to 400°C is not critical.

The acid catalyst may be added to the reaction mixture at the beginning of the reaction, at some time during step a) of the reaction, or after the reaction between 3,7-dimethylocten-(7)-yn-(1)-ol-(3) and the said ester of acetoacetic acid has substantially terminated. It is also possible to isolate, e.g., by distillation, the isomeric reaction products obtained from 3,7-dimethylocten-(7)-yn-(1)-ol-(3) and the said ester of acetoacetic acid at a temperature of from 100° to 400°C before the organic acid catalyst is added.

Conventional acid catalysts, such as inorganic or organic acids, Lewis acids in aqueous solution, acidreacting salts, for example salts of weak bases and strong acids, such as aluminum phosphate, or partial salts of polybasic strong acids, such as potassium hydrogen sulfate, and acid ion exchangers may be used. Acid aluminas are also suitable. It is preferred to use weak inorganic acids or especially organic acids.

Suitable organic acid catalysts are aliphatic and aromatic carboxylic acids having from 1 to 20 carbon atoms, for instance aliphatic monocarboxylic acids such as acetic acid and valeric acid, aliphatic dicarboxylic acids such as adipic acid, aromatic monocarboxylic acids such as benzoic acid, aromatic dicarboxylic acids such as phthalic isophthalic and terephthalic acids, and aromatic polycarboxylic acids such as trimellitic acid and pyromellitic acid.

It is advantageous to choose an acid from which the product may be easily separated by distillation, such as benzoic acid or adipic acid. The amount of catalyst may vary within a wide range and in general is from 0.01 to 10 percent by weight with reference to the starting material. Strong acids are preferably used in an amount of from 0.01 to 0.5 percent by weight and weak acids, especially the organic acids, preferably in an amount of from 0.5 to 10 percent by weight. The optimum amount of catalyst may easily be determined by experiment.

In general solvents are not used. it is however possible to use inert solvents or diluents, such as aliphatic, cycloaliphatic or aromatic hydrocarbons, ethers or esters, particularly those having a boiling point above 150°C at atmospheric pressure. Polar aprotic solvents such as dimethylformamide, dimethyl sulfoxide or N-methylpyrrolidone, are preferred. The solvents or diluents are in general used in an amount which is 0.1 to 10 times the amount of the starting material.

The 6,10-dimethylundecatrien-(3,5,10)-one-(2) obtained may readily be purified by distillation. The product is a valuable starting material for the production of ionone.

Cyclization of the 6,10-dimethylundecatrien-(3,5,10)-one-(2) is effected by reaction with concentrated sulfuric acid at a temperature of between −30 and +20°C in the presence of an aliphatic or aromatic hydrocarbon as solvent.

The sulfuric acid should be used for cyclization in 90 to 98 percent preferably 96 to 98 percent, concentration. For carrying out the reaction, 6,10-dimethylundecatrien-(3,5,10)-one-(2) should be used in such an amount that one mole is present for every 5 to 15, preferably 5 to 12, moles of sulfuric acid. In general, an amount of sulfuric acid about three times the weight of 6,10-dimethylundecatrien-(3,5,10)-one-(2) is used.

All aliphatic and aromatic hydrocarbons may be used whose boiling points are below 200°C. Specific examples are propane, butane, pentane, hexane, cyclohexane, benzene and xylene, either alone or in any combination. The hydrocarbon is used in an amount of 1 to 15, preferably 2 to 14, parts by volume per part by volume of 6,10-dimethylundecatrien-(3,5,10)-one-(2).

The process may be carried out by contacting, in the course of about 5 minutes while stirring, a mixture of sulfuric acid and a hydrocarbon at −30 to +20°C, preferably −20 to 0°C, with the 6,10-dimethylundecatrien-(3,5,10)-one-(2) in the said ratio, the heat of reaction being removed by a cooling bath, preferably methanol or ethanol cooled with dry ice. After 5 to 120, advantageously 5 to 60 and preferably about 15, minutes the product is worked up by conventional methods, i.e., by pouring onto ice, extracting with ether, washing the ethereal solution neutral with caustic soda solution, concentrating and distilling the residue.

The reaction may be carried out continuously or batchwise. β-ionone is an important precursor for the production of Vitamin A. The invention is further illustrated by the following Examples 1 and 3–9. The parts specified in the Examples are by weight.

EXAMPLE 1

152 parts of 98 percent 3,7-dimethylocten-(7)-yn-(1)-ol-(3) and 348 parts of methyl acetoacetate are mixed, 2 parts of adipic acid is added and the whole is heated for 8 hours at 175°C while stirring. Methanol (which is distilled off over a column) and carbon dioxide are eliminated.

In the distillation which is then carried out, 5 parts of 3,7-dimethylocten-(7)yn-(1)-ol-3) and 160.5 parts of 92 percent 6,10-dimethylundecatrien-(3,5,10)-one-(2) (yield 79.5 percent) are obtained. The boiling point at 0.01 mm is 105° to 115°C; $n_D^{25}$=1.5259; $E_{1cm}^{1\%}$ at 291 millimicrons 1,150 (ethanol). By cyclizing 100 parts of this product with 300 parts of concentrated sulfuric acid in the presence of 150 parts of n-hexane at −10°C, 85 parts of β-ionone is obtained. This is 85 percent of the theory based on the 6,10-dimethylundecatrien-(3,5,10)-one-(2) and 73.4 percent of the theory based on the 3,7-dimethylocten-(7)-yn-(1)-ol-3) used.

EXAMPLE 2 (for comparison)

152 parts of 98 percent 3,7-dimethylocten-(7)-in-(1)-ol-3) and 348 parts of methyl acetoacetate are heated for eight hours at 175°C while stirring, methanol and carbon dioxide being eliminated.

In the distillation of the reaction mixture, 5 parts of 3,7-dimethylocten-(7)-in-(1)-ol-3) and 158.5 parts of 6,10-dimethylundecatrien-(3,5,10)-one-(2) (76 percent; yield 65 percent are obtained. The boiling point is 100° to 115°C at 0.01 mm; $n_D^{25}$= 1.5180; $E_{1cm}^{1\%}$ at 291 to 293 millimicrons 950 (ethanol).

By cyclizing 100 parts of this product with 300 parts of concentrated sulfuric acid in the presence of 150 parts of n-hexane at −10°C, only 69 parts of β-ionone is obtained. This is 69 percent of the theory based on the 6,10-dimethylundecatrien-(3,5,10)-one-(2) and 58.5 percent of the theory based on the 3,7-dimethylocten-(7)-yn-(1)-ol-3) used.

EXAMPLE 3

45 parts of the impure 6,10-dimethylundecatrien-(3,5,10)-one-(2) isolated according to Example 2 ($E_{1cm}^{1\%}$ at 291 millimicrons 950 (ethanol), refractive index $n_D^{25}$ = 1.5180) has 0.5 g of benzoic acid added to it and the mixture is stirred for 1 hour at 175°C. The product is distilled and 44 parts of a substance is obtained having $E_{1cm}^{1\%}$ at 291 millimicrons 1,150 (ethanol) and $n_D^{25}$= 1.5250.

By cyclizing 100 parts of this product with 300 parts of concentrated sulfuric acid in the presence of 150 parts of n-hexane at −10°C, 85 parts of β-ionone is obtained. This is 85 percent of the theory based on the 6,10-dimethylundecatrien-(3,5,10)-one-(2) used.

EXAMPLE 4

304 parts of 98 percent 3,7-dimethylocten-(7)-in-(1)-ol-(3) and 464 parts of methyl acetoacetate are mixed and the whole is heated for 1 hour at 175°C while stirring. After that 5 parts of benzoic acid is added and the mixture is stirred for a further 2 hours at 175°C.

In the distillation which is then carried out, 14 parts of 3,7-dimethylocten-(7)-yn-(1)-ol-(3) and 324 parts of 92 percent 6,10-dimethylundecatrien-(3,5,10)-one-(2) (yield 81,3 percent) are obtained. The boiling point at 0.01 mm is 105° to 115°C; $n_D^{25}$ = 1.5259; $E_{1cm}^{1\%}$ at 291 millimicrons 1150 (ethanol). By cyclizing 100 parts of this product with 300 parts of concentrated sulfuric acid in the presence of 150 parts of n-hexane at −10°C, 82 parts of β-ionone is obtained. This is 82 percent of the theory based on the 6,10-dimethylundecatrien-(3,5,10)-one-(2) and 72.7 percent of the theory based on the 3,7-dimethylocten-(7)-yn-(1)-ol-(3) used.

EXAMPLES 5 to 9

The procedure of Example 1 is repeated except that 304 parts of 3,7-dimethylocten-(7)-9n-(1)-ol-(3) (98 percent) and 464 parts of methyl acetoacetate are used and that instead of 2 parts of adipic acid the amounts of other acids given in the Table below are employed. The reaction is carried out at temperatures of from 170° to 190°C and stopped as soon as the elimination of $CO_2$ is over. The resulting reaction times range from 2 to 3 hours.

The results of Examples 5 to 9 are indicated in the following Table.

| Example | acid | parts by weight | 3,7-dimethylocten-(7)-yn-(1)-ol-(3) recovered (parts by weight) | 6,10-dimethyl-undecatrien-(3,5,10)-on-(2) 92% (parts by weight) | yield of β-ionone based on 6,10-dimethyl-undecatrien-(3,5,10)-one-(2) | based on 3,7-dimethyl-octen-(7)-yn-(1)-ol-(3) fed in |
|---|---|---|---|---|---|---|
| 5 | terephthalic acid | 5 | 11 | 316 | 79% | 67.5% |
| 6 | isophthalic acid | 5 | 18 | 311 | 81% | 69.6% |
| 7 | sebacic acid | .5 | 10 | 324 | 78% | 68% |
| 8 | chloroacetic acid | 5 | 11 | 312 | 79% | 67.3% |
| 9 | stearic acid | 10 | 14 | 326 | 77% | 68.6% |

We claim:

1. A process for the production of 6,10-dimethylundecatrien-(3,5,10)-one-(2) which comprises reacting 3.7-dimethylocten-(7)-yn-(1)-ol-(3) with a lower alkanol ester of acetoacetic acid at a temperature of from 100° to 400°C. and treating the reaction mixture with about 0.01 to 10 percent by weight, with reference to the starting material, of a catalyst consisting essentially of an organic acid selected from the class consisting of acetic acid, adipic acid, benzoic acid, phthalic acid, isophthalic acid, terephthalic acid, trimellitic acid and pyromellitic acid at a temperature of from 100° to 400°C.

2. A process as claimed in claim 1 wherein the organic acid catalyst is added to the reaction mixture substantially at the beginning of the reaction of said 3,7-dimethylocten-(7)-yn-(1)-ol-(3) with a lower alkanol ester of acetoacetic acid.

3. A process as claimed in claim 1 wherein the organic acid catalyst is added to the reaction mixture at a point during the reaction of said 3,7,dimethyloctine-(7)-yn-(1)-ol-(3) with a lower alkanol ester of acetoacetic acid.

4. A process as claimed in claim 1 wherein the organic acid catalyst is added to the reaction mixture after the reaction of said 3,7-dimethyloctene-(7)-yn-(1)-ol-(3) with a lower alkard ester of acelocetic acid has substantially terminated.

5. A process as claimed in claim 1 wherein the reaction of 3,7-dimethylocten-(7)-yn-(1)-ol-(3) with the lower alkanol ester of acetoacetic acid and the treatment with said organic acid catalyst are carried out at a temperature of about 150° to 250°C.

* * * * *

UNITED STATES PATENT AND TRADEMARK OFFICE
CERTIFICATE OF CORRECTION

PATENT NO. : 3,860,655
DATED : January 14, 1975
INVENTOR(S) : Horst Pommer et al It is certified that error appears in the above-identified patent and that said Letters Patent are hereby corrected as shown below:

In the Heading, insert -- [30] Foreign Application Priority Data   February 4, 1967   Germany   P 12 86 018.3 (formerly B 91038 IVb/120)--

In the Heading, insert -- [56] References Cited
UNITED STATES PATENTS   2,839,579   6/1958   Kimel et al   260/595
2,877,271   3/1959   Kaiser et al   260/587
FOREIGN PATENTS OR APPLICATIONS   741,047   11/1955
Britain   260/595   OTHER PUBLICATIONS   Morrison et al, "Organic Chemistry", p.489 (1959) --

In the Abstract, Lines 1 & 2, delete "... 3,7-dimethylocten-7-yn-(1)-ol-(3)..." and substitute --... 3,7-dimethylocten-7-in-(1)-ol-(3)...--

In Column 1, Diagram III (Lines 45-50) delete

"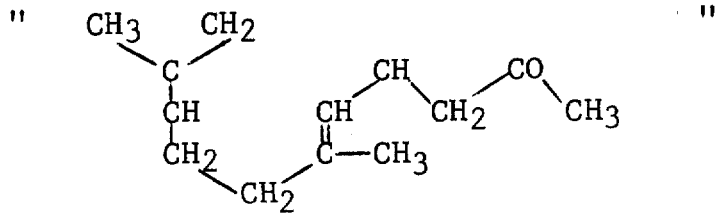"

and substitute

--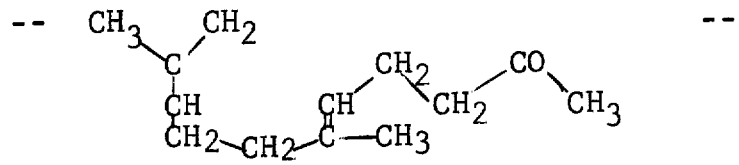--

UNITED STATES PATENT AND TRADEMARK OFFICE
CERTIFICATE OF CORRECTION

PATENT NO. : 3,860,655
DATED : January 14, 1975
INVENTOR(S) : Horst Pommer et al It is certified that error appears in the above-identified patent and that said Letters Patent are hereby corrected as shown below:

In Column 2, Line 7, delete "... dimethylocten-(7)-9n-(1)-ol-(3)..." and substitute --... dimethylocten-(7)-yn-(1)-ol-(3)--

In Column 2, Line 24, delete "... 3,7-dimethylocten-(7)-yn-(1)ol-3)..." and substitute --... 3,7-dimethylocten-(7)-yn-(1)-ol-(3)...--

In Column 4, Line 42, delete "... 3,7-dimethylocten-(7)yl-(1)-ol-(3)..." and substitute --... 3,7-dimethylocten-(7)-yl-(1)-ol-(3)...--

In Column 4, Line 52, delete "... 3,7-dimethylocten-(7)-yl-(1)-ol-3)..." and substitute --... 3,7-dimethylocten-(7)-yl-(1)-ol-(3)...--

In Column 4, Line 55, delete "... 3,7-dimethylocten-(7)-in-(1)-ol-3)..." and substitute --... 3,7-dimethylocten-(7)-yn-(1)-ol-(3)...--

In Column 5, Line 38, delete "... 3,7-dimethylocten-(7)-in-(1)-ol-(3)..." and substitute --... 3,7-dimethylocten-(7)-yn-(1)-ol-(3)...--

In Column 5, Line 60, delete "... 3,7-dimethylocten-(7)-9n-(1)-ol-(3)..." and substitute --... 3,7-dimethylocten-(7)-yl-(1)-ol-(3)...--

Signed and Sealed this

Ninth Day of November 1976

[SEAL]

Attest:

RUTH C. MASON
Attesting Officer

C. MARSHALL DANN
Commissioner of Patents and Trademarks